April 6, 1948.                J. H. LEVIN                2,439,254
                    JOINT FOR AIR DUCTS AND THE LIKE
                         Filed June 19, 1944

J. H. Levin
INVENTOR.

BY
ATTORNEYS.

Patented Apr. 6, 1948

2,439,254

UNITED STATES PATENT OFFICE 2,439,254

JOINT FOR AIR DUCTS AND THE LIKE

Joseph H. Levin, Brooklyn, N. Y.

Application June 19, 1944, Serial No. 540,902

1 Claim. (Cl. 285—143)

This invention relates to a joint designed primarily for use in connection with air ducts such as formed of sheet metal although, in a modified form, it is also useful as a joint for cast pipes and similar structures.

It is a fact well known to those skilled in the art that during the assembly of the sections of ducts such as formed, for example, of sheet metal, considerable difficulty has been experienced in placing the sections end to end and holding them properly placed until bolted. This same difficulty has also been encountered during the installation of heavy iron pipes having end flanges to be bolted together.

The present invention has for an object the provision of a new and novel form of joint whereby the sections can be quickly assembled end to end and supported in properly assembled position pending the insertion of the bolts used for fastening them together.

A further object is to provide a joint which enables the sections of a duct to be joined in interlocking relation and to be easily taken apart even though the sections are positioned in the angle defined by the wall and ceiling of an enclosure.

Another object is to provide a duct the end flanges of which are formed of angle metal riveted or otherwise securely joined to the duct section, these flanges being formed with bolt openings so that when the sections of the duct are properly assembled end to end, the openings will register and permit ready insertion of bolts used for drawing the flanges of the sections toward each other.

Another object is to provide a joint which permits the use of a gasket between the joined flanges of opposed sections so as to make the joint tight.

A still further and very important object is to provide a joint especially useful in ventilating ducts of ships and other structures subjected to severe vibration. Heretofore the vibrations have caused bolts and other coupling means to work loose, thereby permitting the duct sections to separate. The present invention serves to hold the sections of the duct assembled even though one or more bolts should work loose or become detached.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Figure 1:
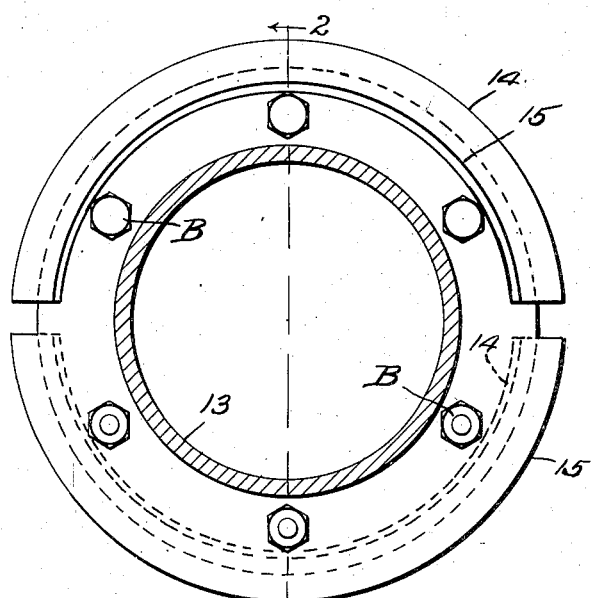
Figure 1 is a transverse section through a pipe having a coupling constructed in accordance with the invention, the two members of the coupling being shown engaged with each other and in elevation.
Figure 2:
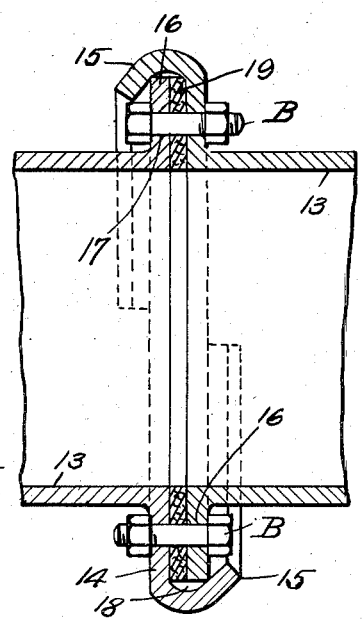
Figure 2 is a section on line 2—2, Figure 1.

Referring to the drawing in detail, the pipe sections to be connected have been indicated by the numeral 13. Extending outwardly from the upper portion of each section at one end is a flange 14 extending through a little less than 180°, the outer edge of this flange being extended inwardly so as to lap the flange and form a lip 15. A similar flange 14 with a lip 15 is located at the bottom portion of the section at the other end thereof. Another flange 16 is arranged flush with each of the flanges 14 but is disposed oppositely thereto and is also extended through somewhat less than 180°. This flange is located at the lower portion of that end of the section from which flange 14 is extended upwardly but is on the upper portion of the opposed end of the section. All of the flanges are provided with bolt-receiving openings 17.

In assembling pipe sections provided with these integral flanges, one section is set up with the flange 14 at its free end located lowermost. The other section to be joined thereto is positioned with its flange 14 where it can overlie and engage flange 16 of the opposed section whereas flange 16 of the section being mounted, is located above the lip 15 of the placed section. The two sections are then brought together, the second section being lowered so that its flange 16 will drop into the channel 18 formed by lip 15 while the lip 15 on the second section which is being placed, will drop behind the flange 16 on the first or placed section. Said flanges can then be adjusted annularly to bring the bolt openings into register after which the bolts B can be inserted and tightened. If desired a gasket 19 can be interposed between the flanges to insure a tight joint when the bolts are tightened.

From the foregoing it will be seen that due to the peculiar construction of the joint, the connection will hold the assembled sections substantially in alinement even though no bolts are used, thereby greatly expediting the assembly of the parts. Furthermore as the sections are assembled by lowering one section relative to the other and then shifting it laterally, it becomes possible readily to assemble these sections when placed in close proximity to a wall and a floor or ceiling where it is practically impossible to get between the sections and the wall, etc., for the purpose of inserting fastening devices. Under those conditions the only bolts that need be used are those which are insertible into the flanges which can be reached.

As the joints will hold the sections together even though many of the bolts should become detached, the said joint is especially useful in joining the sections of ducts used in ventilating and/or air-conditioning systems on boats and other structures subject to extreme vibration.

What is claimed is:

A pipe joint including opposed pipe sections to be joined, a flange on one end of each section, said flange being extended continuously around said section, a lip extending from and lapping each of the flanges, each lip being extended along its flange for a distance less than one half of the circumference of the flange, each lip being inclined relative to its flange and cooperating therewith to provide a channel tapered in depth and extending throughout the length of the lip, the channel on each flange being proportioned to receive a portion of the opposed flange and said lip and the flange therein cooperating to draw the flanges together under the weight of the connected pipe sections, a packing material interposed between the flanges and extending through the channels, and means for holding the flanges and the packing material together.

JOSEPH H. LEVIN.

REFERENCES CITED

The following references are of record in the file of this patent:

UNITED STATES PATENTS

| Number | Name | Date |
| --- | --- | --- |
| 653,143 | Martin | July 3, 1900 |
| 958,043 | Stockley | May 17, 1910 |
| 1,446,057 | Moyen | Feb. 20, 1923 |
| 1,450,826 | Walten | Apr. 3, 1923 |

FOREIGN PATENTS

| Number | Country | Date |
| --- | --- | --- |
| 26,759 | Denmark | Aug. 12, 1920 |